S. L. BEAN.
Method of Collecting and Grading Dust of Flour and Grain in Flour Mills.
No. 228,023. Patented May 25, 1880.
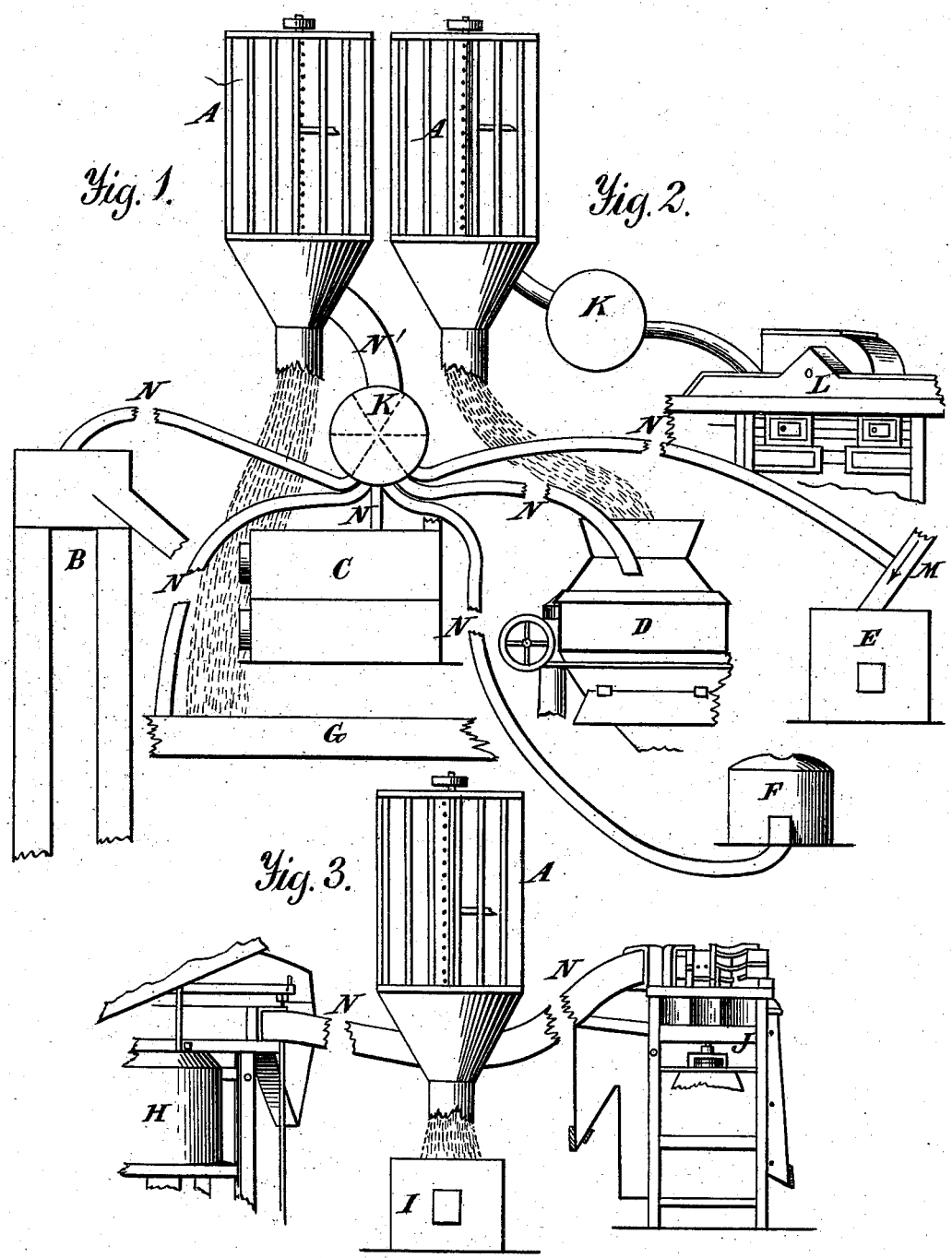

UNITED STATES PATENT OFFICE.

SAMUEL L. BEAN, OF WASHINGTON, DISTRICT OF COLUMBIA.

METHOD OF COLLECTING AND GRADING DUST OF FLOUR AND GRAIN IN FLOUR-MILLS.

SPECIFICATION forming part of Letters Patent No. 228,023, dated May 25, 1880.

Application filed January 21, 1880.

*To all whom it may concern:*

Be it known that I, SAMUEL L. BEAN, of the city and county of Washington, in the District of Columbia, have invented certain new and useful Improvements in the Method of Collecting and Grading Dust of Flour and Grain in Flour-Mills, of which the following is a specification.

This invention relates, in general, to all mills where substances are reduced and ground; but it is more especially designed for use in flouring-mills, in connection with which it will be herein described.

Its objects are to prevent the escape of dust from the various machines and appliances of flour-mills, to collect this dust, and to separate it into grades in the act of collecting it.

To these ends the invention consists in creating air-currents from a plant of milling machinery, the various machines and appliances of which produce substantially the same grade of dust to a screen or screens, whereby the dust is strained off from the air and is collected, to be returned to its appropriate grade of flour, or to a separate receptacle, as circumstances may require, or as may be deemed most expedient.

It further consists in collecting dust by a separate screen or screens from each plant of milling machinery which produces a different grade of dust, so as to grade the dust of a whole mill in the act of collecting it, the different grades of dust being returned to their appropriate grades of flour, or to separate receptacles.

In order that my invention may be clearly understood, I will proceed to describe said method with the aid of the annexed drawings, in which—

Figure 1 illustrates a mode of applying the invention to a plant of machinery for operating on flour-chop. Fig. 2 illustrates a mode of applying the invention to a middlings-purifier producing the same grade of flour-dust as the machinery illustrated in Fig. 1. Fig. 3 illustrates a mode of applying the invention to a plant of machinery for cleaning wheat.

In the practical applications of my invention I prefer to employ a balloon or balloons, A, for straining the dust of flour or grain from the currents of air drawn from a plant of milling machinery and blown into said balloon or balloons, through the reticulated cloth-covered sides of which the air may escape back into the mill while the dust is strained off. The balloon has a hopper bottom to receive the strained-off dust, from which hopper bottom it can be spouted to its proper place. If flour-dust, it may be spouted to its appropriate grade of flour or chop. If grain-dust, it will be spouted to a separate receptacle.

Unless all the machines on which such a balloon operates have themselves appliances for creating sufficiently strong currents of air, a fan-blower, K, (one or more,) is combined with the balloon to induce air-currents from said machines to the balloon, the machines being connected by separate air-trunks N to the fan, which is in turn connected by a trunk, N', to the balloon. Where sufficiently strong currents of air are generated in the machines the air-trunks N lead directly to the balloons.

The elevator B, bolting-chest C, crushing-rollers D, stock-bin E, spout M to stock-bin, millstones F, conveyer G, are all supposed to yield substantially the same grade of flour-dust, which is returned from the balloon to the conveyer G. The flour-dust from the middlings-purifier L is also supposed to be of substantially the same grade, and is therefore returned to the crushing-rollers D.

The smut-mill H and the brush-machine J are supposed to yield the same grade of grain-dust, which is therefore returned to a receptacle, I, connected with a balloon operating on both the smutter and the brush-machine.

An incidental, but nevertheless very important, advantage resulting from my method of collecting the dust of flour and grain from all the machines and appliances of a flour-mill is that the warm air from such machines and appliances can be returned into the mill, thereby avoiding indrafts of cold air.

From the foregoing description it will be understood that by my method the dust of flour or grain arising in a mill is separated into various grades in the act of collecting it. Each screen or balloon acts upon a determinate plant of milling machinery operating upon a given grade of material which yields substantially the same grade of dust in the various machines and devices of said plant; and by the term "plant," as used here and in the claims, I mean a line of machinery which operates upon a material (irrespective of its condition or stage of reduction) which yields substantially the same grade of dust in the different machines and devices through which such material passes.

Having thus described my invention, what I claim as new is—

1. The method, substantially as before set forth, of collecting dust of flour or grain from a plant of milling machinery operating upon a given grade of material, which method consists in inducing air-currents from the various machines and devices (such as the stones, bolt-chests, middlings-purifiers, &c.) of said plant to a dust-catching screen or screens, from which the collected dust is returned to its appropriate grade.

2. The method, substantially as before set forth, of collecting dust of flour or grain in mills and separating it into grades, which method consists in inducing air-currents from each plant of milling machinery operating upon a different grade of material to a separate screen or screens, from which separate screen or screens the separated grades of collected dust are returned to their appropriate grades for subsequent utilization.

In testimony whereof I have signed my name to the foregoing specification in the presence of two subscribing witnesses.

SAML. L. BEAN.

Witnesses:
   A. J. STACKPOLE,
   L. E. STACKPOLE.